(12) United States Patent  
Ayabe

(10) Patent No.: US 7,581,071 B2  
(45) Date of Patent: Aug. 25, 2009

(54) APPARATUS FOR AND METHOD OF PROCESSING INFORMATION, AND PROGRAM

(75) Inventor: Yuji Ayabe, Kanagawa (JP)

(73) Assignee: Sony Corporation, Tokyo (JP)

( * ) Notice: Subject to any disclaimer, the term of this patent is extended or adjusted under 35 U.S.C. 154(b) by 371 days.

(21) Appl. No.: 11/409,441

(22) Filed: Apr. 21, 2006

(65) Prior Publication Data

US 2006/0239639 A1 Oct. 26, 2006

(30) Foreign Application Priority Data

Apr. 22, 2005 (JP) ............................ 2005-124936

(51) Int. Cl.
- G06F 13/00 (2006.01)
- G06F 13/28 (2006.01)
- G06F 5/00 (2006.01)
- G06F 3/00 (2006.01)

(52) U.S. Cl. ......................................... 711/154; 710/52
(58) Field of Classification Search ................. 711/154; 710/52
See application file for complete search history.

(56) References Cited

U.S. PATENT DOCUMENTS

2004/0017630 A1 * 1/2004 Akagi et al. .................. 360/69

2004/0064607 A1 * 4/2004 Odakura et al. ............... 710/57

FOREIGN PATENT DOCUMENTS

| JP | 3-100924 | 4/1991 |
|---|---|---|
| JP | 5-159507 | 6/1993 |
| JP | 2001 143390 | 5/2001 |
| JP | 2002 185926 | 6/2002 |
| JP | 2003 224802 | 8/2003 |
| JP | 2004-260452 | 9/2004 |
| JP | 2004-310953 | 11/2004 |
| JP | 2004 334967 | 11/2004 |

* cited by examiner

*Primary Examiner*—Matt Kim
*Assistant Examiner*—Edward J Dudek
(74) *Attorney, Agent, or Firm*—Frommer Lawrence & Haug, LLP; William S. Frommer; Thomas F. Presson

(57) ABSTRACT

When an information processing apparatus is turned on, startup processes for an HDD and a DVD are started. When the startup process for the HDD is finished, the information processing apparatus starts to record recording data in the HDD. Thereafter, when the startup process for the DVD is finished, the information processing apparatus dubs recorded contents of the HDD, i.e., recorded data already recorded in the HDD, at a high rate to the DVD. The invention is applicable to a recording and reproducing apparatus having an HDD and a DVD as recording mediums.

3 Claims, 6 Drawing Sheets

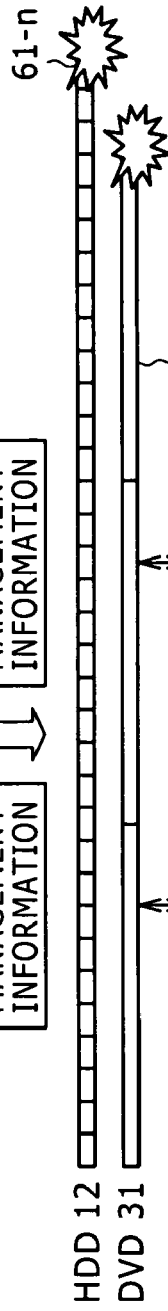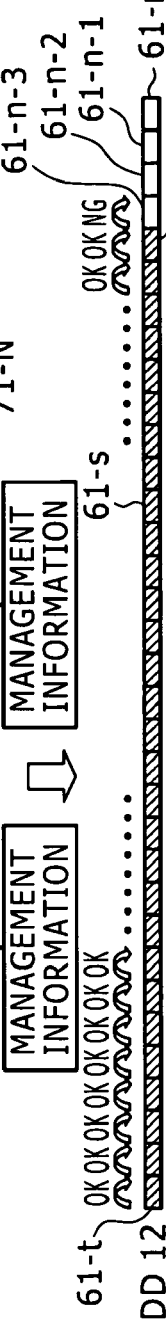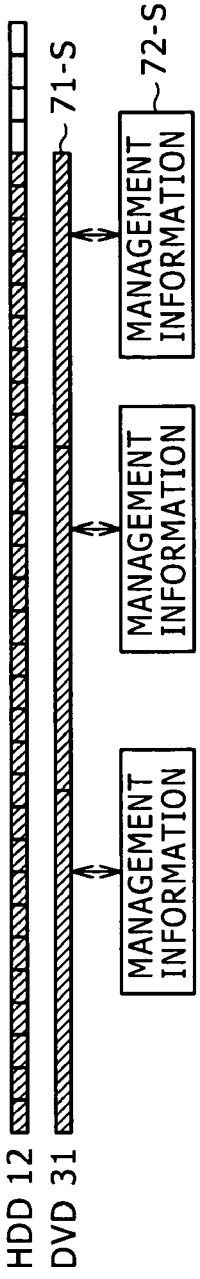

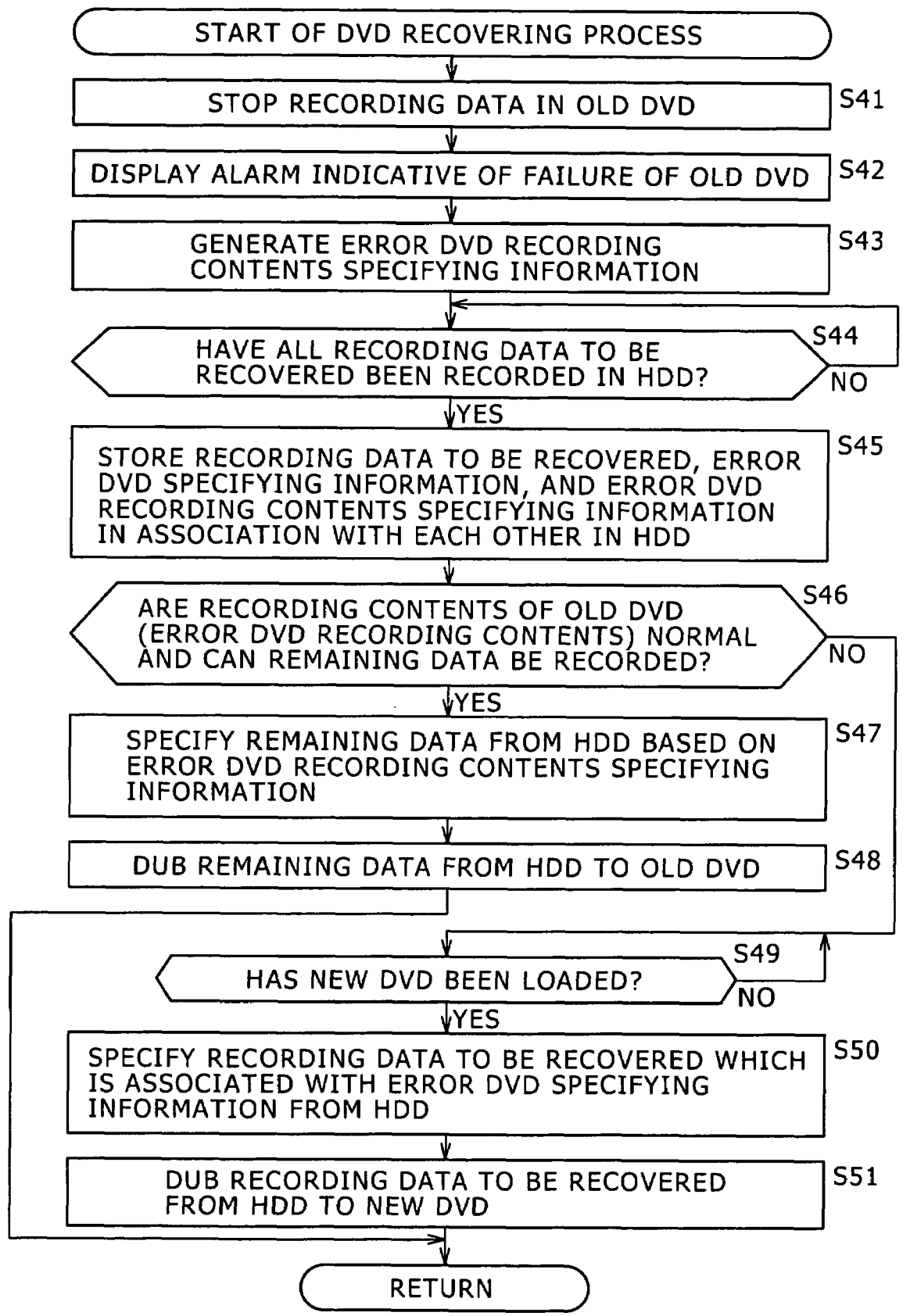

APPARATUS FOR AND METHOD OF PROCESSING INFORMATION, AND PROGRAM

CROSS REFERENCES TO RELATED APPLICATIONS

The present invention contains subject matter related to Japanese Patent Application JP 2005-124936 filed in the Japanese Patent Office on Apr. 22, 2005, the entire contents of which being incorporated herein by reference.

BACKGROUND OF THE INVENTION

The present invention relates to an apparatus for and a method of processing information, and a program, and more particularly to an apparatus for and a method of processing information, and a program which are capable of shortening a period of time required until data start to be recorded in a medium after the apparatus has been turned on.

In recent years, recording apparatus (see, for example, Japanese Patent Laid-open-No. 2004-260452) have been finding widespread use in various fields. For example, recording apparatus for recording internal body images of patients which are captured by ultrasonic diagnostic systems have been used in the medical field.

SUMMARY OF THE INVENTION

The conventional recording apparatus requires a startup process to be performed for a data recording medium when the apparatus are turned on. Therefore, data cannot start to be recorded in the data recording medium until after the startup process is finished. If a recording apparatus employs a data recording medium whose startup process is time-consuming, then it takes a long period of time for the recording apparatus to start recording data in the data recording medium.

It is desirable to provide an apparatus for and a method of processing information, and a program which are capable of shortening a period of time required until data start to be recorded in a medium after the apparatus has been turned on.

According to an embodiment of the present invention, there is provided an apparatus for processing information by recording data in a medium of a first type and a medium of a second type, including startup process control means for controlling a first startup process for the medium of the first type and a second startup process for the medium of the second type to be performed when the apparatus for processing information is turned on, the second startup process being more time-consuming than the first startup process, first recording control means for starting to record predetermined recording data in the medium of the first type when the first startup process controlled by the startup process control means is finished, and second recording control means for starting to read the predetermined recording data which are recorded in the medium of the first type by the first recording control means, from the medium of the first type, and recording the read predetermined recording data in the medium of the second type when the second startup process controlled by the startup process control means is finished.

According to another embodiment of the present invention, there is also provided a method of processing information in an apparatus for processing information by recording data in a medium of a first type and a medium of a second type, including the steps of (a) controlling a first startup process for the medium of the first type and a second startup process for the medium of the second type to be performed when the apparatus for processing information is turned on, the second startup process being more time-consuming than the first startup process, (b) starting to record predetermined recording data in the medium of the first type when the first startup process controlled by the step (a) is finished, and (c) starting to read the predetermined recording data which are recorded in the medium of the first type by the step (b), from the medium of the first type, and recording the read predetermined recording data in the medium of the second type when the second startup process controlled by the step (a) is finished.

According to still another embodiment of the present invention, there is further provided a program which corresponds to the above method of processing information.

With the apparatus for and the method of processing information and the program according to the present invention, when the apparatus for processing information or the recording apparatus is turned on, the first startup process for the medium of the first type and the second startup process for the medium of the second type, which is more time-consuming than the first startup process for the medium of the first type, are started. When the first startup process is finished, predetermined recording data start to be recorded in the medium of the first type. When the second startup process is finished, the predetermined recording data already recorded in the medium of the first type are read from the medium of the first type and recorded in the medium of the second type.

The medium of the first type and the medium of the second type may include mediums incorporated in the apparatus for processing information, or may include removable mediums.

The first type and the second type may be different types or may be one type.

According to the present invention, data can be recorded in mediums. The period of time required until data start to be recorded in a medium after the apparatus for processing information or the recording apparatus is turned on is shortened.

The above and other objects, features, and advantages of the present invention will become apparent from the following description when taken in conjunction with the accompanying drawings which illustrate a preferred embodiment of the present invention by way of example.

BRIEF DESCRIPTION OF THE DRAWINGS

FIG. 3 is a diagram showing a salvaging process which is performed by a salvaging process controller in the function system shown in FIG. 2;

FIG. 6 is a flowchart of a DVD recovering process executed in step S31 of the recording process shown in FIG. 5.

DETAILED DESCRIPTION OF THE PREFERRED EMBODIMENT

Figure 1:
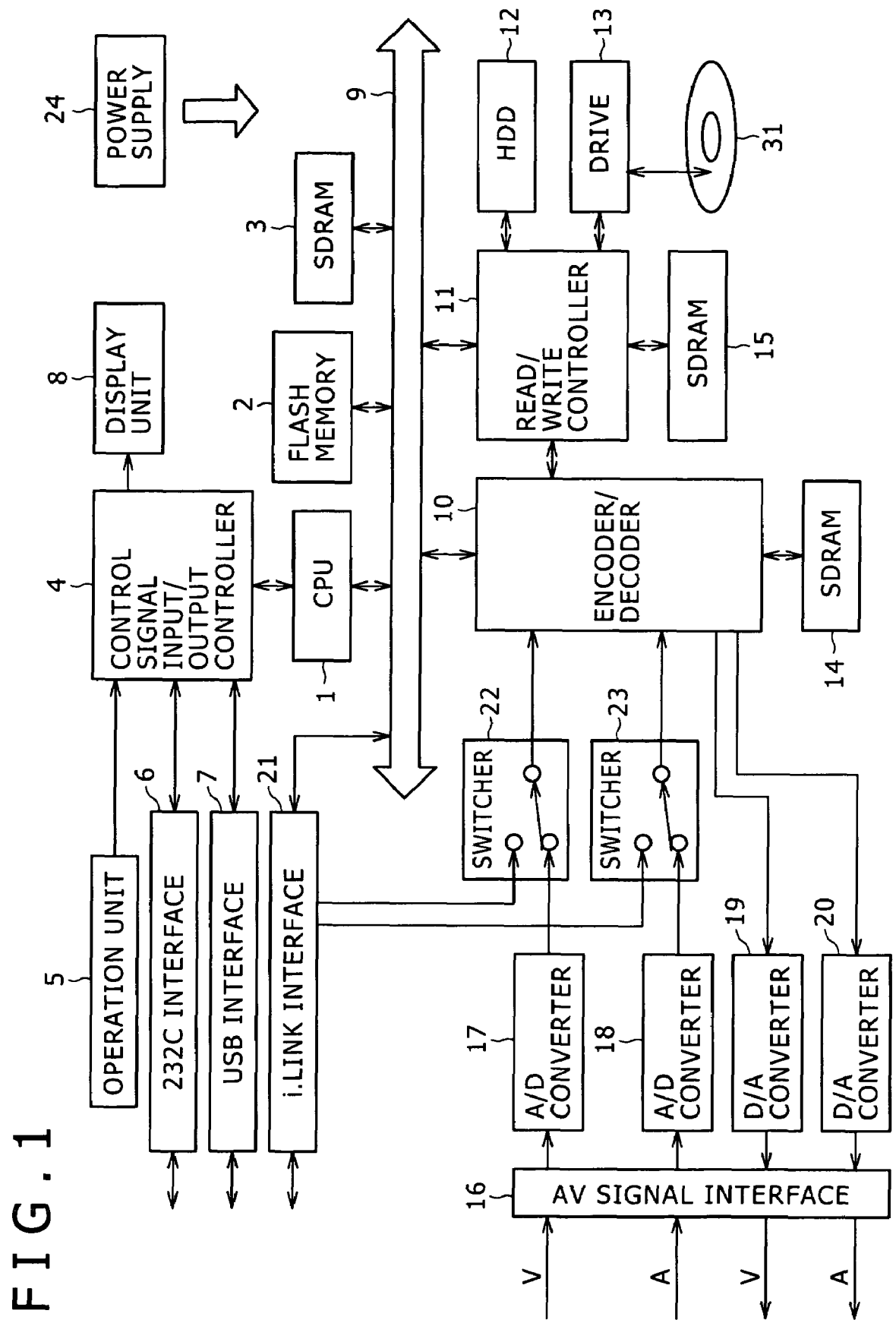
FIG. 1 is a block diagram of a hardware system of a recording and reproducing apparatus according to the present invention.

Components called for in claims and specific components described in the embodiment below are related to each other as described below. The description of the relation between those claimed components and specific components serves to confirm that the specific components that support the invention described in the claims are described in the embodiment. Just because there are specific components described in the embodiment, but not described to refer to claimed components does not necessarily mean that those specific components do not correspond to claimed components. Conversely, just because there are specific components described to refer to claimed components does not necessarily mean that those specific components do not correspond to other components than claimed components.

The description of the relation between those claimed components and specific components does not serve to confirm that all of the specific components described in the embodiment are called for in the claims. Stated otherwise, the description of the relation between those claimed components and specific components does not deny the existence of inventions covering specific components that are described in the embodiment, but not called for in the claims, i.e., the existence of inventions which may be filed in divisional applications and/or added by way of amendments in the future.

According to the present invention, there is provided an apparatus for processing information. The apparatus for processing information (e.g., a recording and reproducing apparatus having a hardware system shown in FIG. 1 and a functional system shown in FIG. 2) is an apparatus for processing information by recording data in a medium of a first type (e.g., a HDD 12 shown in FIGS. 1 and 2) and a medium of a second type (e.g., a DVD 31 shown in FIGS. 1 and 2), including:

startup process control means (e.g., a startup process controller 42 shown in FIG. 2) for controlling a first startup process for the medium of the first type and a second startup process for the medium of the second type to be performed when the apparatus for processing information is turned on, the second startup process being more time-consuming than the first startup process;

first recording control means (e.g., a HDD recording controller 43 shown in FIG. 2) for starting to record predetermined recording data (e.g., data output from an encoder/decoder 10 shown in FIG. 1, i.e., compressed contents data to be described later) in the medium of the first type when the first startup process controlled by the startup process control means is finished; and second recording control means (e.g., a DVD recording controller 44 shown in FIG. 2) for starting to read the predetermined recording data which are recorded in the medium of the first type by the first recording control means, from the medium of the first type, and recording the read predetermined recording data in the medium of the second type when the second startup process controlled by the startup process control means is finished.

Figure 5:
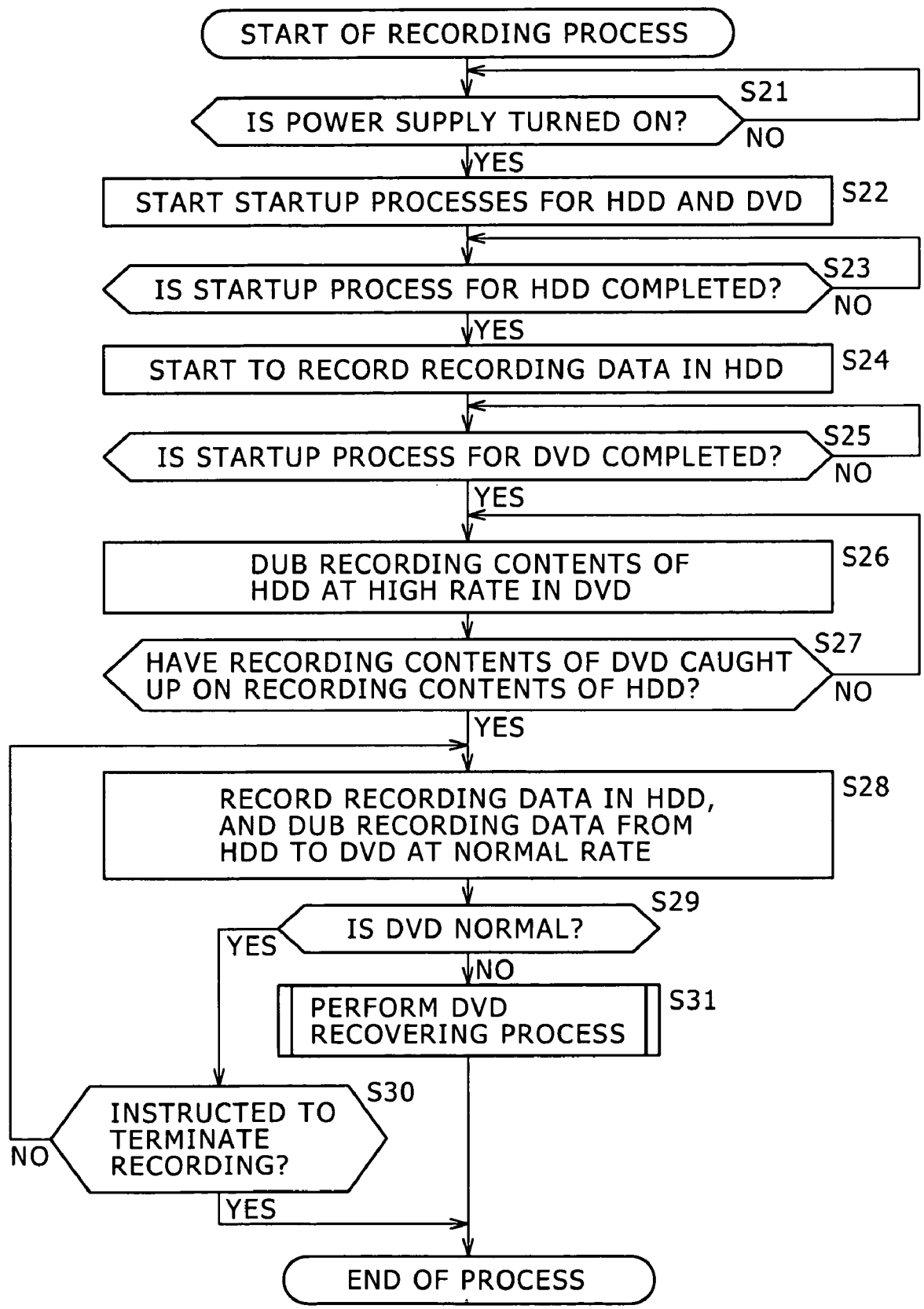
FIG. 5 is a flowchart of a recording process which is performed by the recording and reproducing apparatus shown in FIG. 2.

According to the present invention, there is also provided a method of processing information. The method of processing information (e.g., a method corresponding to a recording process shown in FIG. 5) in an apparatus for processing information (e.g., a recording and reproducing apparatus having a hardware system shown in FIG. 1 and a functional system shown in FIG. 2) by recording data in a medium of a first type and a medium of a second type, including the steps of:

(a) controlling (e.g., step S22 shown in FIG. 5) a first startup process for the medium of the first type and a second startup process for the medium of the second type to be performed when the apparatus for processing information is turned on (e.g., YES in step S21 shown in FIG. 5), the second startup process being more time-consuming than the first startup process;

(b) starting (e.g., step S24 shown in FIG. 5) to record predetermined recording data in the medium of the first type when the first startup process controlled by the step (a) is finished (e.g., YES in step S23 shown in FIG. 5); and (c) starting (e.g., step S26 shown in FIG. 5) to read the predetermined recording data which are recorded in the medium of the first type by the step (b), from the medium of the first type, and recording the read predetermined recording data in the medium of the second type when the second startup process controlled by the step (a) is finished (e.g., YES in step S25 shown in FIG. 5).

According to the present invention, there is further provided a program. The program corresponds to the above method of processing information according to the present invention, and is executed by a computer having a CPU 1 shown in FIG. 1, for example.

FIG. 1 shows in block form a hardware system of a recording and reproducing apparatus according to the present invention.

As shown in FIG. 1, the recording and reproducing apparatus has a CPU (Central Processing Unit) 1 for executing various processes according to various programs that have been loaded from a FLASH memory 2 into an SDRAM (Synchronous Dynamic Random Access Memory) 3, thereby to control overall operation of the recording and reproducing apparatus. The SDRAM 3 also stores data required for the CPU 1 to execute the various processes.

A control signal input/output controller 4 is connected to the CPU 1. The control signal input/output controller 4 is in the form of a microcomputer, for example, and controls an exchange of various control signals between blocks including the CPU 1, operation unit 5, a 232C interface 6, a USB interface 7, and a display unit 8.

The operation unit 5 includes various input devices including a keyboard, a power supply switch, a foot switch, etc. The user-can input various commands and various pieces of information through the operation of the operation unit 5 to the recording and reproducing apparatus. In other word, when the user operates the operation unit 5, the operation unit 5 supplies a control signal corresponding to the operation of the user through the control signal input/output controller 4 to the CPU 1, etc.

An external device, not shown, is connected to the 232C interface 6 through a dedicated RS-232C cable. The 232C interface 6 relays various pieces of information (control signals) that are sent and received between the external device and the CPU 1, etc. according to RS-232C standards. Another external device, not shown, is connected to the USB interface 7 through a dedicated USB cable. The USB interface 7 relays various pieces of information (control signals) that are sent and received between the external device and the CPU 1, etc. according to USB standards.

The display unit 8 includes a front panel display unit, for example, and displays various pieces of information with respect to the recording and reproducing apparatus, or various pieces of information corresponding to various control signals that are supplied from the CPU 1, etc. through the control signal input/output controller 4.

The CPU 1, the FLASH memory 2, and the SDRAM 3 are connected to each other through a bus 9 that is connected to an encoder/decoder 10 and a read/write controller 11.

The encoder/decoder 10 is controlled by the CPU 1 to encode (compress) a digital video signal V supplied from a switcher 22 (to be described later) and a digital audio signal A supplied from a switcher 23 (to be described later) according to the MPEG (Moving Picture Experts Group) process, for example, and supplies the encoded data to the read/write controller 11. The video and audio data that have been encoded and output from the encoder/decoder 10 will hereinafter be referred to as compressed contents data.

The encoder/decoder 10 is also controlled by the CPU 1 to decode (expand) compressed contents data supplied from the read/write controller 11 according to the MPEG process, for example, and supplies a decoded digital video signal V to a D/A converter 19 and a decoded digital audio signal A to a D/A converter 20.

An SDRAM 14 is connected to the encoder/decoder 10. The SDRAM 14 stores data required for the encoder/decoder 10 to perform the above processes thereof.

The read/write controller 11 is controlled by the CPU 1 to control the reading of various data from and the writing of various data in a HDD 12 or a DVD (Digital Versatile Disk) 31 mounted in a drive 13.

For example, if the read/write controller 11 is supplied with compressed contents data from the encoder/decoder 10, the read/write controller 11 first records (writes) the supplied compressed contents data as recording data in the HDD 12. Then, the read/write controller 11 reads the recording data recorded in the HDD 12 and records (writes) the data in the DVD 31 mounted in the drive 13.

The recording and reproducing apparatus is based on ATA (AT attachment) standards. Therefore, the recording data are first recorded in the HDD 12 and then recorded in the DVD 31. If the recording and reproducing apparatus is based on other standards than the ATA standards, then the recording data may be recorded in the HDD 12 and the DVD 31 concurrently, e.g., independently and substantially at the same timing.

The read/write controller 11 reads data (compressed data, various pieces of management information, etc.) recorded in the HDD 12 or the DVD 31 mounted in the drive 13, and supplies the read data to the encoder/decoder 10 or other blocks.

An SDRAM 15 is connected to the read/write controller 11. The SDRAM 15 stores data required for the read/write controller 11 to perform the above processes thereof.

External devices, not shown, are connected to an AV signal interface 16 through various cables. For example, a first external device such as an ultrasonic diagnostic system is connected to the AV signal interface 16. The first external device supplies an analog video signal V, specifically a video signal V representing an internal body image of a patient, through the AV signal interface 16 to an A/D converter 17, and also supplies an analog audio signal A through the AV signal interface 16 to an A/D converter 18. An analog video signal V supplied from the encoder/decoder 10 through the A/D converter 19 and an analog audio signal A supplied from the encoder/decoder 10 through the A/D converter 20 are supplied through the AV signal interface 16 to a second external device, e.g., a monitor or the like.

An external device, not shown, is connected to an i.LINK interface 21 through a dedicated i.Link cable. i.LINK is a registered trademark of SONY CORPORATION which is the assignee of the present application, and refers to a high-speed digital serial interface according to IEEE (Institute of Electrical and Electronics Engineers) 1394 standards. The i.LINK interface 21 relays various pieces of information (video signals, audio signals, control signals, etc.) between the external device connected thereto and the CPU 1 and also between the external device connected thereto and the encoder/decoder 10 according to the IEEE 1394 standards. Specifically, when the i.LINK interface 21 is supplied with a control signal from the external device connected thereto, the i.LINK interface 21 supplies the control signal to the CPU 1. When the i.LINK interface 21 is supplied with a video signal V from the external device connected thereto, the i.LINK interface 21 converts the video signal V into a signal of a suitable format, or a signal having the same format as the digital video signal V output from A/D converter 17, and supplies the signal to the switcher 22. When the i.LINK interface 21 is supplied with an audio signal A from the external device connected thereto, the i.LINK interface 21 converts the audio signal A into a signal of a suitable format, or a signal having the same format as the digital audio signal A output from A/D converter 18, and supplies the signal to the switcher 23. The external devices connected to the i.LINK interface 21 include an ultrasonic diagnostic system.

The switcher 22 selects one of input terminals thereof at a time, and supplies a digital video signal V that is input to the selected input terminal to the encoder/decoder 10. Specifically, the switcher 22 selects either one of an input terminal for being supplied with a digital video signal V from the i.LINK interface 21 and an input terminal for being supplied with a digital video signal V from the A/D converter 17, and supplies the digital video signal V that is applied to the selected input terminal to the encoder/decoder 10.

The switcher 23 selects one of input terminals thereof at a time, and supplies a digital audio signal A that is input to the selected input terminal to the encoder/decoder 10. Specifically, the switcher 23 selects either one of an input terminal for being supplied with a digital audio signal A from the i.LINK interface 21 and an input terminal for being supplied with a digital audio signal A from the A/D converter 18, and supplies the digital audio signal A that is applied to the selected input terminal to the encoder/decoder 10.

A power supply 24 supplies required electric power to the various blocks described above of the recording and reproducing apparatus shown in FIG. 1. For the sake of brevity, power lines by which the electric power from the power supply 24 is supplied to the blocks of the recording and reproducing apparatus are collectively illustrated as a single blank arrow.

Through not shown, the drive 13 may be constructed to be loaded with, in addition to the DVD 31, a removable recording medium such as a magnetic disk, an optical disk, a magnetooptical disk, or a semiconductor memory. If such a removable recording medium is employed, then the removable recording medium is controlled by the read/write controller 11. Specifically, the recording data referred to above are recorded in the removable recording medium. If a computer program is recorded in the removable recording medium, then the computer program is read from the removable recording medium through the drive 13 and installed in a memory such as the HDD 12 according to need.

Stated otherwise, though the mediums for reading recording data therefrom and writing recording data therein are illustrated as the HDD 12 and the DVD 31 in FIG. 1, the mediums are not limited to the HDD 12 and the DVD 31 in FIG. 1, but may be mediums of any types.

Figure 2:
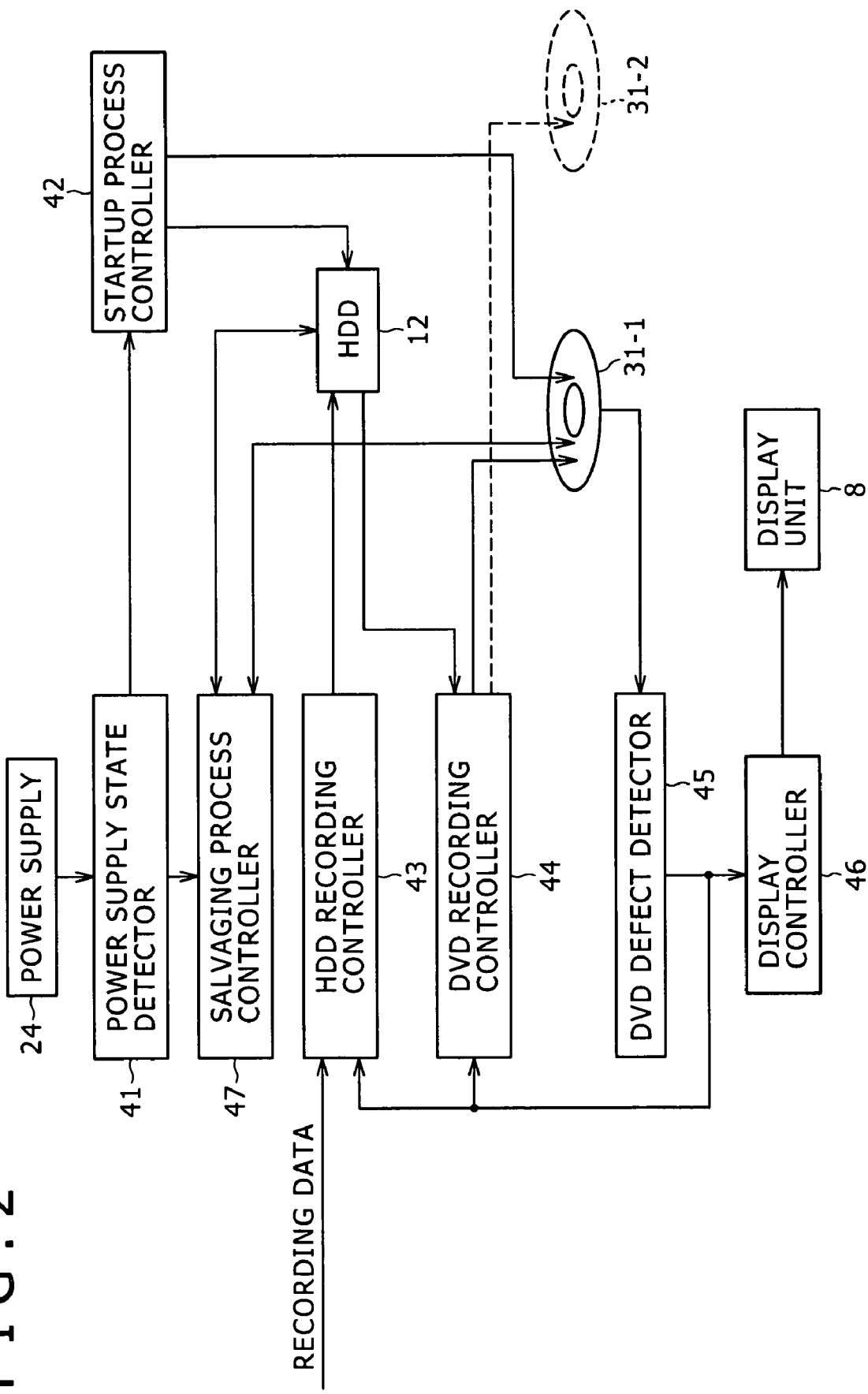
FIG. 2 is a block diagram of a functional system having recording functions of the recording and reproducing apparatus shown in FIG. 1.

The hardware system of the recording and reproducing apparatus is not limited to the details shown in FIG. 1, but may be of any configurations insofar as it has a functional arrangement shown in FIG. 2.

A functional system having functions for recording the recording data in the HDD 12 and the DVD 31, of the recording and reproducing apparatus shown in FIG. 1, will be described below with reference to FIG. 2. FIG. 2 shows in block form a functional system having recording functions of the recording and reproducing apparatus shown in FIG. 1.

Functional blocks including a power supply state detector 41, a startup process controller 42, a HDD recording controller 43, a DVD recording controller 44, a DVD failure detector 45, and a display controller 46 as shown in FIG. 2 are implemented as application software to be executed by the CPU 1 shown in FIG. 1. However, each of the functional blocks may be implemented by (or may be seen as) a combination of the application software and at least one of the hardware blocks shown in FIG. 1. The hardware system of the recording and reproducing apparatus shown in FIG. 1 may be modified such that the functional blocks ranging from the power supply state detector 41 to the display controller 46 may be constructed respectively as single hardware components.

For performing the recording functions, the functions ranging from the power supply state detector 41 to the display controller 46 may be provided as a whole, and the number of overall functions, i.e., functional blocks, is not limited to the number of blocks shown in FIG. 2. Specifically, the functional blocks ranging from the power supply state detector 41 to the display controller 46 may be divided into smaller blocks, or two or more of the functional blocks may be combined into one block.

In FIG. 2, two DVDs 31-1, 31-2 are illustrated. Unless these DVDs need to be distinguished from each other, the DVD 31-1 will be referred to as the DVD 31.

In the recording and reproducing apparatus shown in FIG. 2, the power supply state detector 41 detects the state of the power supply 24. Specifically, the power supply state detector 41 determines whether the power supply 24 is in a turned-on state or a turned-off state. The detected state is indicated from the power supply state detector 41 to the startup process controller 42 and a salvaging process controller 47.

When it is indicated from the power supply state detector 41 to the startup process controller 42 that the power supply 24 is turned on, or the power supply 24 has changed from the turned-off state to the turned-on state, the startup process controller 42 performs respective startup processes for the HDD 12 and the DVD 31.

The startup process for the HDD 12 includes a process of turning on the HDD 12, a process of issuing a resetting command, a process of waiting for (confirming) a disk rotation, and a process of issuing an identify command (a command for acquiring information of the HDD 12) and confirming a connected state of the HDD 12.

The startup process for the DVD 31 includes a process of physically and logically formatting the DVD 31, an OPC process (a process of testing laser recording conditions), and a process of recording information in inner and outer areas. The process of recording information in inner and outer areas is a process of writing prescribed information on physical formats in inner and outer areas of the DVD 31. The prescribed information represents a disk category, a disk size, recordable/unrecordable information, etc.

It is to be noted that the startup process for the DVD 31 is much longer than the startup process for the HDD 12 because it includes a time-consuming process such as the OPC process and the process of recording information in inner and outer areas. According to the present embodiment, recording data are first recorded in the HDD 12 for which the startup process is completed earlier than the DVD 31, or recording data start to be recorded in the HDD 12 while the startup process for the DVD 31 is being performed, and when the startup process for the DVD 31 is thereafter completed, the data recorded in the HDD 12 thus far are dubbed (recorded) at a high rate in the DVD 31. When the data recorded in the DVD 31 catch up on the data recorded in the HDD 12, recording data are successively recorded in the HDD 12 and the DVD 31 according to their sequence. The recording process described above will be referred to as a catch-up recording process. The catch-up recording process will be described later in detail with reference to a flowchart in FIG. 5.

Compressed contents data from the encoder/decoder 10 are input as recording data to the HDD recording controller 43. The HDD recording controller 43 controls the recording of the recording data in the HDD 12.

At this time, in order to allow the salvaging process controller 47 to perform a salvaging process, which will be described later with reference to FIG. 3, the HDD recording controller 43 records the recording data in the HDD 12 according to a file system of the HDD 12 without giving the recording data stream data management information (management information 72 shown in FIG. 3) inherent in the format of the DVD 31.

Specifically, in the HDD 12, the file system independent of the DVD format, or specifically the file system which prescribes data units (e.g., units of 512 kB) that are smaller than management units (titles to be described later) managed by the stream data management information, and also prescribes times, manages the recording and reproducing (writing/reading) of the recording data.

The DVD recording controller 44 controls the reading of recording data recorded in the HDD 12, and the recording of the recording data in the DVD 31.

At this time, the DVD recording controller 44 records the recording data in the DVD 31, with titles (see titles 71 shown in FIG. 3) as larger units and chapters as smaller units.

According to the present embodiment, a title refers to an interval after a beginning of recording is instructed until an end of recording is instructed. In the present embodiment, a maximum of 49 titles can be recorded in a single DVD 31 according to the DVD format. Each title is associated with a single piece of the stream data management information referred to above (hereinafter simply referred to as management information). Therefore, the DVD recording controller 44 records each title in association with its management information in the DVD 31.

A chapter refers to an interval defined by two indexes. According to the present embodiment, the user can apply an index as a mark to a desired location (e.g., a location corresponding to a desired image) in recording data (stream) that are successively recorded, by operating the operation unit 1. The user can also make a certain registering action to cause the recording and reproducing apparatus to automatically apply indexes at certain time intervals, for example. Then, the user can easily control the recording and reproducing apparatus to instantaneously reproduce the recording data from a location marked with an index or repeatedly reproduce the recording data between indexes or in a chapter. In the present embodiment, a maximum of 254 indexes can be applied to a single DVD 31, and a maximum of 99 indexes can be applied to a single title according to the DVD format.

More accurately, the DVD recording controller 44 records each title in association with a single piece of management information in the DVD 31. Details of the control process performed by the DVD recording controller 44 will be described below with reference to FIG. 3.

The DVD defect detector 45 serves to detect a failure (defect) of the DVD 31 based on whether not or the DVD 31 has suffered a recording error or whether the DVD 31 has suffered a large recording error or a small recording error while recording data are being recorded on the DVD 31 by the DVD recording controller 44. A detected result from the DVD defect detector 45 is sent to the HDD recording controller 43, the DVD recording controller 44, and the display controller 46.

For example, if the detected result sent from the DVD defect detector 45 indicates that the DVD 31 has suffered a failure, then the DVD recording controller 44 stops (inhibits) its control process, and the display controller 46 controls the display unit 8 to display (present) an alarm indicative of the failure of the DVD 31.

It should be noted that even if the DVD 31 has suffered a failure and the DVD recording controller 44 stops (inhibits) its control process, the control process of the HDD recording controller 43 is continued, or recording data are continuously recorded in the HDD 12. The HDD recording controller 43 also executes steps S43 through S45 shown in FIG. 3 as described later. The description of the processing is omitted here.

Therefore, even if the DVD 31-1 shown in FIG. 2 has suffered a failure, or if the DVD 31-1 has not suffered a failure but recording data cannot be read from the DVD 31-1 due to scratch, damage, or the like caused after the recording data have been recorded, or if the DVD 31-1 itself is lost, the recording data that either are to be recorded in the DVD 31-1 or have been recorded in the DVD 31-1 (hereinafter referred to as recording contents of the DVD 31-1) are recorded in their entirety in the HDD 12. In this case, the user can dub the recording contents of the DVD 31-1 from the HDD 12 to the DVD 31-2 by inserting a new DVD 31-2 into the drive 13 (see FIG. 1), or recover the recording contents of the DVD 31-1 in the DVD 31-2. At this time, the DVD recording controller 44 performs its control process to read the recording contents of the DVD 31-1 from the HDD 12 and records the recording contents of the DVD 31-1 in the DVD 31-2. The process of the recording and reproducing apparatus which is carried out to recover the recording contents of a DVD that has suffered a failure or a problem described above, will hereinafter referred to as a DVD recovering process. Details of the DVD recovering process will be described below with reference to a flowchart in FIG. 6.

Figure 4:
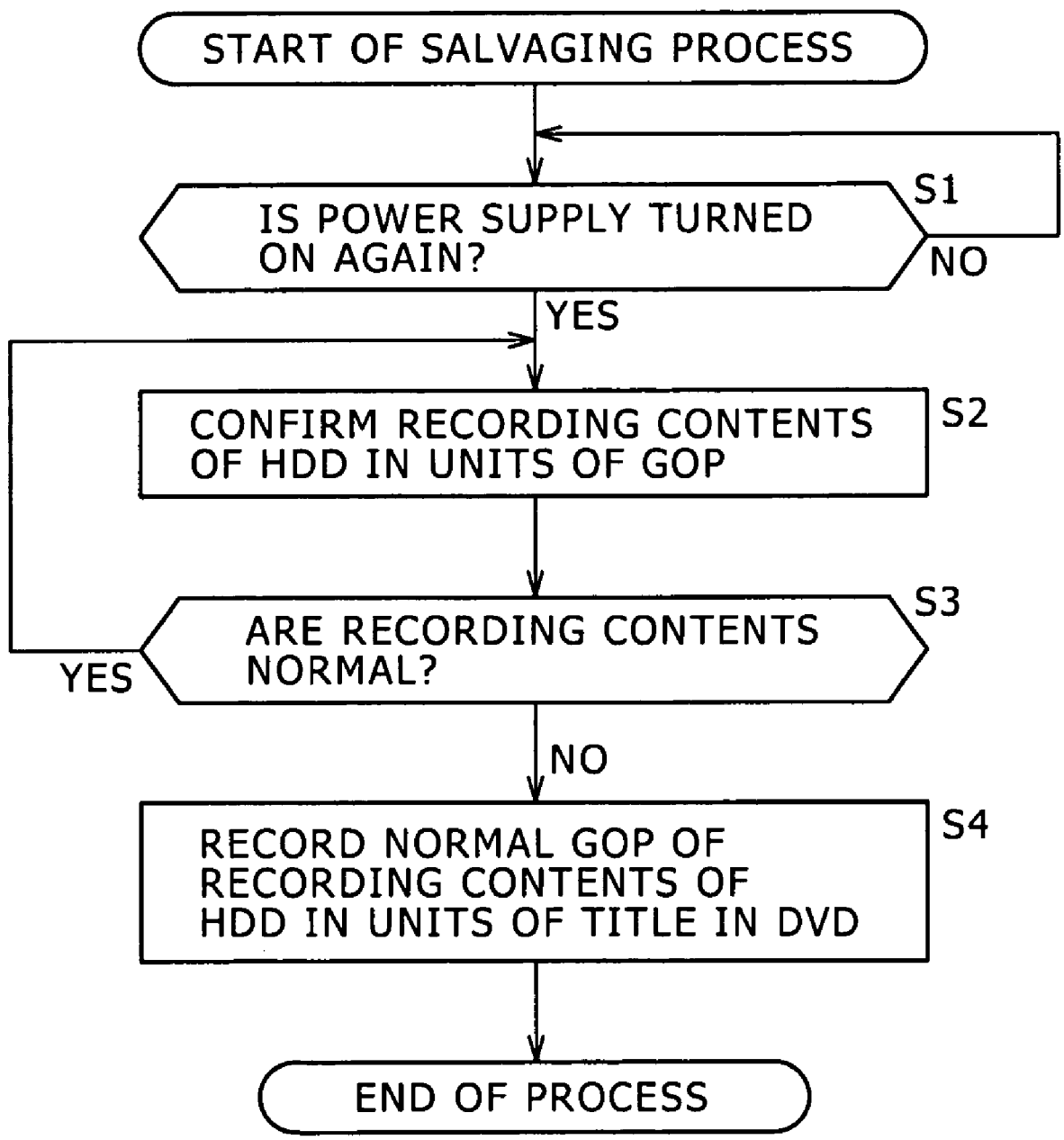
FIG. 4 is a flowchart of the salvaging process which is performed by the salvaging process controller of the recording and reproducing apparatus shown in FIG. 2.

The salvaging process controller 47 controls a salvaging process shown in FIGS. 3 and 4, for example.

FIG. 3 schematically shows a salvaging process according to the present invention, and FIG. 4 is a flowchart of the salvaging process. The salvaging process according to the present invention will be described below with reference to FIGS. 3 and 4.

FIG. 3 shows recording contents of the HDD 12 and the DVD 31 at respective times represented by "DURING NORMAL RECORDING", "POWER SUPPLY TURNED OFF", "POWER SUPPLY TURNED ON AGAIN", "DURING SALVAGING", and "AFTER SALVAGING".

The time represented by "DURING NORMAL RECORDING" refers to a time at which the recording and reproducing apparatus shown in FIG. 2 is in a normal state (the power supply 24 is turned on.)

In the time represented by "DURING NORMAL RECORDING", recording data are recorded in the HDD 12 in data units (e.g., data units of 512 kB) prescribed by the file system of the HDD 12, not according to the DVD format, as described above. Since recording data are MPEG compressed contents data in the present embodiment, data units to be salvaged, i.e., recovered, should not be data units of 512 kB, but need to be at least GOP (Group of Picture) units. Therefore, at least data in GOP units need to be failure-free. In FIG. 3, therefore, recording contents of the HDD 12 are shown as being recorded in units of GOP 61. On the other hand, recording contents of DVD 31 are recorded in titles 71 each associated with a single piece of management information 72.

The time represented by "POWER SUPPLY TURNED OFF" refers to a time at which the power supply 24 changes from the turned-on state to the turned-off state. In FIG. 3, the time represented by "POWER SUPPLY TURNED OFF" occurs while recording data corresponding to the GOP61-$n$ are being recorded in the HDD 12 and recording data corresponding to the title 71-N are being recorded in the DVD 31.

If the management information 72 corresponding to the title 71-N has not been written in the DVD 31 until the time represented by "POWER SUPPLY TURNED OFF" occurs, the final title 71-N is eliminated in its entirety from the DVD 31. The elimination of the title 71-N is indicated in right-hand recording contents of the DVD 31 at the time represented by "POWER SUPPLY TURNED ON AGAIN". Specifically, the elimination of the title 71-N is represented by a pattern of hatched lines. The time represented by "POWER SUPPLY TURNED ON AGAIN" refers to a time at which the power supply 24 changes again from the turned-off state to the turned-on state.

The salvaging process controller 47 performs a salvaging process as indicated by right-hand recording data in the time represented by "DURING SALVAGING" and the time represented by "AFTER SALVAGING" shown in FIG. 3. The time represented by "DURING SALVAGING" refers to a time at which the salvaging process controller 47 is performing a salvaging process, and the time represented by "AFTER SALVAGING" refers to a time at which the salvaging process controller 47 has finished the salvaging process.

As indicated by right-hand recording data in the time represented by "DURING SALVAGING", the salvaging process controller 47 successively checks the recording data which correspond to the recording contents of the DVD 31, of all the recording contents of the HDD 12. Though the salvaging process controller 47 checks, more properly, data units (e.g., data units of 512 kB) in the file system of the HDD 12, since a minimum unit to be salvaged is a GOP (e.g., 15 frames), it is assumed here that the salvaging process controller 47 checks data units in GOPs. Specifically, the salvaging process controller 47 checks whether or not a plurality of GOPs of the recording data which correspond to the recording contents of the DVD 31 are normal, successively from the first GOP 61-$t$.

In FIG. 3, the GOPs 61-$t$ through 61-$n$-4 are determined as normal (OK), and the subsequent GOPs 61-$n$-3 through 61-$n$ are determined as abnormal (NG).

The salvaging process controller 47 reads the GOPs 61-$t$ through 61-$n$-4 from the HDD 12, divides them into titles, and records the divided titles in association with respective pieces of management information in the DVD 31. Consequently, as indicated by right-hand recording data in the time represented by "AFTER SALVAGING", a title 71-S which corresponds to the eliminated title 71-N, i.e., a title 71-S including normal data of the recording data, which correspond to the eliminated title 71-N, recorded in the HDD 12 is recorded (recovered) in association with its management information 72-S in the DVD 31.

In the HDD 12, as described above, the file system which prescribes data units that are smaller than data units of the DVD 31 and also prescribes times, manages the recording data. Therefore, in the event of a malfunction such as a power failure or the like of the recording and reproducing apparatus shown in FIG. 2, the HDD 12 tends to keep more surviving data (normal data) than the DVD 31. According to the present embodiment, when the recording and reproducing apparatus shown in FIG. 2 suffers a malfunction such as a power failure or the like, the salvaging process controller 47 can record those more surviving data from the HDD 12 in the DVD 31. Consequently, it is possible to reliably protect recording data that have been recorded up to the time of the malfunction, i.e., data contained in the final title that has been recorded in the DVD 31 at the time of the malfunction.

As shown in FIG. 3, even in the event of a malfunction such as a power failure or the like of the recording and reproducing apparatus shown in FIG. 2, other titles than the final title (the title 71-N in FIG. 3) that has been recorded in the DVD 31 at the time of the malfunction have not been eliminated and can be read normally after the power supply 24 is turned on again because the management information corresponding to those other titles is recorded in the DVD 31. Therefore, though the salvaging process controller 47 checks whether or not the recording data are normal successively from the first GOP 61-t which corresponds to the first data of the recording contents of the DVD 31 in the above example, the salvaging process controller 47 may start checking whether or not the recording data are normal from the GOP 61-s which corresponds to the first data of the eliminated title 71-N. To perform the latter checking process, the HDD recording controller 43 shown in FIG. 2 may record the first address of the title being recorded in the DVD 31, i.e., the final title of the DVD 31, or specifically, the first address of the GOP 61-s in FIG. 3, in a given area of the HDD 12.

The salvaging process will be described below with reference to the flowchart shown in FIG. 4.

The salvaging process is started at the time represented by "POWER SUPPLY TURNED OFF" shown in FIG. 3, for example.

In step S1, the power supply state detector 41 determines whether or not the power supply 24 is turned on again, that is, whether or not the power supply 24 has changed again from the turned-off state to the turned-on state.

Insofar as the power supply 24 is in the turned-off state, the power supply state detector 41 determines in step S1 that the power supply 24 is not turned on again, and control goes back to step S1 to repeat a looped process for determining whether or not the power supply 24 is turned on again.

Thereafter, if the power supply 24 has changed again from the turned-off state to the turned-on state, then the power supply state detector 41 determines in step S1 that the power supply 24 is turned on again, and control goes to step S2.

In step S2, the salvaging process controller 47 confirms the recording contents of the HDD 12 in units of GOP, i.e., GOP by GOP.

More precisely, though the data units to be confirmed are data units according to the file system of the HDD 12, they are confirmed in GOP units for the reasons described above. The GOP to be confirmed first may be the first GOP of the first title, i.e., the GOP 61-t shown in FIG. 3, or the first GOP of the final title to be salvaged which has been eliminated from the DVD 31 owing to a power failure, i.e., the GOP 61-s in FIG. 3.

In step S3, the salvaging process controller 47 determines whether or not the recording contents are normal.

If the salvaging process controller 47 determines that the recording contents are normal in step S3, control goes back to step S2 to repeat the processing from step S2. Therefore, the salvaging process controller 47 successively determines whether or not the GOPs of the recording contents of the HDD 12 are normal.

If a failing GOP, i.e., the GOP 61-n-3 in FIG. 3, is confirmed, then the salvaging process controller 47 determines that the recording contents are not normal in step S3, and control goes to step S4.

In step S4, the salvaging process controller 47 records the titles of the normal GOPs of the recording contents of the HDD 12 in association with their management information in the DVD 31.

The salvaging process is now put to an end.

A recording process which is performed by the recording and reproducing apparatus having the functional system shown in FIG. 2 will be described below with reference to FIG. 5. FIG. 5 is a flowchart of the recording process according to the present invention which includes the catch-up recording process and the DVD recovering process mentioned above.

In step S21, the power supply state detector 41 determines whether or not the power supply 24 is turned on, that is, whether or not the power supply 24 has changed from the turned-off state to the turned-on state.

Insofar as the power supply 24 is in the turned-off state, the power supply state detector 41 determines in step S21 that the power supply 24 is not turned on, and control goes back to step S21 to repeat a looped process for determining whether or not the power supply 24 is turned on.

Thereafter, if the power supply 24 has changed from the turned-off state to the turned-on state, then the power supply state detector 41 determines in step S21 that the power supply 24 is turned on, and control goes to step S22.

In step S22, the startup process controller 42 starts to perform the startup processes for the HDD 12 and the DVD 31.

As described above, the startup process for the DVD 31 is more time-consuming than the startup process for the HDD 12, or the startup process for the HDD 12 is completed earlier than the startup process for the DVD 31. In step S23, the HDD recording controller 43 determines whether or not the startup process for the HDD 12 is completed.

While the startup process for the HDD 12 is being executed, the HDD recording controller 43 determines in step S23 that the startup process for the HDD 12 is not completed. Control goes back to step S23 to repeat a looped process for determining whether or not the startup process for the HDD 12 is completed. Therefore, while the startup process for the HDD 12 is being executed, the HDD recording controller 43 holds its recording process.

If the startup process for the HDD 12 is completed, or if the HDD recording controller 43 determines in step S23 that the startup process for the HDD 12 is completed, then control goes to step S24.

In step S24, the HDD recording controller 43 starts to record recording data in the HDD 12. Hereinafter, the HDD recording controller 43 continuously records recording data in the HDD 12 unless otherwise specified.

During this time, the startup process for the DVD 31 is still continued. In step S25, the DVD recording controller 44 determines whether or not the startup process for the DVD 31 is completed.

While the startup process for the DVD 31 is being executed, the DVD recording controller 44 determines in step S25 that the startup process for the DVD 31 is not completed. Control goes back to step S25 to repeat a looped process for determining whether or not the startup process for the DVD 31 is completed. Therefore, while the startup process for the DVD 31 is being executed, the DVD recording controller 44 holds its recording process, and the HDD recording controller 43 successively records recording data in the HDD 12.

If the startup process for the DVD 31 is completed, or if the DVD recording controller 44 determines in step S25 that the startup process for the DVD 31 is completed, then control goes to step S26.

In step S26, the DVD recording controller 44 dubs at a high rate the recording contents of the HDD 12, or the data of the recording data as a stream which have been successively recorded in the HDD 12 after step S24, in the DVD 31. The high-rate dubbing process refers to a process of reading the recording contents of the HDD 12 and recording the recording contents in the DVD 31 at a rate higher than the recording data are recorded in the HDD 12 by the HDD recording controller 43. During the high-rate dubbing process, new recording data (stream) are successively recorded in the HDD 12 by the HDD recording controller 43.

In step S27, the DVD recording controller 44 determines whether or not the recording contents of the DVD 31 have caught up on the recording contents of the HDD 12.

If the DVD recording controller 44 determines in step S27 that the recording contents of the DVD 31 have not caught up on the recording contents of the HDD 12, then control goes back to step S26 to repeat the processing from step S26. Specifically, since, after step S24, the HDD recording controller 43 successively records new recording data (new stream data) in the HDD 12, the recording contents of the HDD 12 are dubbed at a high rate in the DVD 31 until the recording contents of the DVD 31 catch up on the recording contents of the HDD 12.

When the recording contents of the DVD 31 catch up on the recording contents of the HDD 12, or if the DVD recording controller 44 determines in step S27 that the recording contents of the DVD 31 have caught up on the recording contents of the HDD 12, then control goes to step S28.

In step S28, the HDD recording controller 43 records recording data (new stream data) in the HDD 12, and the DVD recording controller 44 dubs the recording data (new stream data) from the HDD 21 in the DVD 31 at a normal rate. The normal-rate dubbing process refers to a process of reading the recording contents of the HDD 12 and recording the recording contents in the DVD 31 at a rate which is substantially the same as the rate at which the HDD recording controller 43 records recording data in the HDD 12.

In step S29, the DVD defect detector 45 determines whether or not the DVD 31 is normal, that is, whether or not the DVD 31 is not suffering a failure.

If the DVD defect detector 45 determines in step S29 that the DVD 31 is normal, or the DVD 31 is not suffering a failure, then control goes to step S30.

In step S30, the HDD recording controller 43 determines whether or not it has been instructed to terminate the recording process.

If the HDD recording controller 43 determines in step S30 that it has not been instructed to terminate the recording process, then control goes back to step S28 to repeat the processing from step S28. Specifically, insofar as the DVD 31 is normal, or the DVD 31 is not suffering a failure, a looped process from steps S28, S29 (YES), step S30 (NO) is repeated to successively record new recording data (new stream data) in the HDD 12 and the DVD 31.

If the HDD recording controller 43 determines in step S30 that it has been instructed to terminate the recording process, the recording process is put to an end.

If the DVD 31 suffers a failure during the looped process from steps S28, S29 (YES), step S30 (NO), then the DVD defect detector 45 determines in next step S29 that the DVD 31 is not normal, and the DVD recovering process is carried out in step S31.

Details of the DVD recovering process are shown in a flowchart of FIG. 6. The details of the DVD recovering process will be described below with reference to FIG. 6.

It is assumed in the DVD recovering process that the DVD 31-1 shown in FIG. 2 is determined as a DVD which is not normal, or which is suffering a failure, in step S29 shown in FIG. 5. The DVD 31-1 is referred to as an old DVD 31-1. The recording contents of the old DVD 31-1 are recovered to the DVD 31-2 shown in FIG. 2. The DVD 31-2 is referred to as a new DVD 31-2.

In step S41, the DVD recording controller 44 stops recording data in the old DVD 31-1.

In step S42, the display controller 46 controls the display unit 8 to display an alarm indicative of the failure of the old DVD 31-1.

In step S43, the HDD recording controller 43 generates error DVD recording contents specifying information.

The error DVD recording contents specifying information refers to information (addresses or the like) indicative of an area of the HDD 12 where a data portion dubbed in the old DVD 31-1 (hereinafter referred to as error DVD recording contents), of all the recording data (all stream data) to be originally recorded in the old DVD 31-1, is recorded during a period from the time when the processing in step S26 shown in FIG. 5 is started to the time when the DVD 31-1 is determined as being not normal, or as suffering a failure. The error DVD recording contents specifying information makes it possible to specify error DVD recording contents of all the recorded contents of the HDD 12.

During this time, the HDD recording controller 43 successively records new recording data (new stream data) in the HDD 12. The new recording data (new stream data) represents a remaining portion (remaining stream data portion) following the error DVD recording contents, of all the recording data (all stream data) to be originally recorded (dubbed) in the old DVD 31-1. The remaining portion will hereinafter be referred to as remaining data. The sum of the remaining data and the error DVD recording contents represents all recording data (all stream data) to be originally recorded in the old DVD 31-1, and is to be recovered. The sum of the remaining data and the error DVD recording contents will hereinafter be referred to as recording data to be recovered.

In step S44, the HDD recording controller 43 determines whether or not all the recording data to be recovered have been recorded in the HDD 12.

Until all the recording data to be recovered have been recorded in the HDD 12, a looped process in which control branches from step S44 (NO) back to step S44 is repeated.

If all the recording data to be recovered have been recorded in the HDD 12, or it is determined in step S44 that the answer to step S44 is YES, then control goes to step S45.

In step S45, the HDD recording controller 43 stores the recording data to be recovered, error DVD specifying information, and the error DVD recording contents specifying information, which are associated with each other, in the HDD 12.

The error DVD specifying information refers to information capable of specifying the old DVD 31-1, or the DVD 31-1 which has been determined as being not normal, or as suffering a failure, in step S29 shown in FIG. 5. The error DVD specifying information may be any information capable of specifying the old DVD 31-1, and may be information such as ID originally recorded in the old DVD 31-1 or information generated by the HDD recording controller 43 and written in the old DVD 31-1 during the startup process in step S22 shown in FIG. 5 or at the start of the processing in step S26. In the present embodiment, the latter information is used as the error DVD specifying information.

In step s46, the DVD defect detector 45 determines whether or not the recording contents of the old DVD 31-1, or the error DVD recording contents, are normal and the old DVD 31-1 is capable of recording remaining data.

For example, even if the old DVD 31-1 is normal, it may possibly be determined as being not normal, or as suffering a failure, in step S29 due to an erroneous detection by the DVD defect detector 45. In this case, the DVD defect detector 45 determines that the recording contents of the old DVD 31-1, i.e., the error DVD recording contents, are normal and the old DVD 31-1 is capable of recording remaining data, and control goes to step S47.

In step S47, the DVD recording controller 44 specifies remaining data (their recording area) of the HDD 12 based on the error DVD recording contents specifying information.

In step S48, the DVD recording controller 44 dubs the remaining data from the HDD 12 in the old DVD 31-1. The DVD recovering process is now terminated.

Generally, if it is determined in step S29 that the old DVD 31-1 is normal, or the old DVD 31-1 is suffering a failure, then it often happens that at least a portion of the recording contents of the old DVD 31-1, i.e., the error DVD recording contents, is abnormal and/or the old DVD 31-1 is no longer able to record remaining data due to scratch, damage, or the like. In this case, the answer to step S46 becomes NO, and control jumps to step S49.

In step S49, the DVD recording controller 44 determines whether or not the new DVD 31-2 is loaded into the drive 13 (see FIG. 1).

After the old DVD 31-1 is removed from the drive 13 and until the new DVD 31-2 is loaded into the drive 13, a looped process from step S49 (NO) back to step S49 is repeated.

If the new DVD 31-2 is loaded into the drive 13, or if the answer to step S49 is YES, then control goes to step S50.

In step S50, the DVD recording controller 44 specifies recording data to be recovered (their recording area) associated with the error DVD specifying information from the HDD 12.

In step S51, the DVD recording controller 44 dubs the recording data to be recovered from the HDD 12 to the new DVD 31-2. The DVD recovering process is now put to an end.

As described above, the flowchart shown in FIG. 6 represents an example of the DVD recovering process in the event of a failure of the DVD 31-1 which has occurred while recording data are being recorded in the DVD 31-1 by the recording process shown in FIG. 5.

However, even after the recording process shown in FIG. 5 is normally finished (after the answer to step S30 is YES), or even after all the recording data (all stream data) are normally recorded in the DVD 31-1, the DVD 31-1 may suffer a failure. Such a failure occurs when the recording data cannot be read from the DVD 31-1 due to scratch, damage, or the like caused after the recording data have been recorded, or when the DVD 31-1 itself is lost.

For performing the DVD recovering process in the event of a failure after the recording data are normally recorded, information capable of specifying the DVD 31-1 to which dubbing of recording data from the HDD 12 has been normally finished, i.e., information corresponding to the error DVD specifying information (hereinafter referred to as DVD specifying information), and information indicative of an area of the HDD 12 where the recording contents of the DVD 31-1 (all the recording data dubbed from the HDD 12, i.e., recording data to be recovered), or information corresponding to the error DVD recording contents specifying information (hereinafter referred to as DVD recording contents specifying information) may be stored in association with each other in the HDD 12.

In this case, the recording and reproducing apparatus shown in FIG. 2 may perform the following DVD recovering process (not shown): The display controller 46 controls the display unit 8 to display a list of DVD specifying information or the like for the user to select an old DVD 31-1 to be recovered. When the user loads a new DVD 31-1 into the driver 13, the DVD recording controller 44 specifies the recording data to be recovered from the HDD 12 based on the DVD recording contents specifying information that is associated with the DVD specifying information of the old DVD 31-1. The DVD recording controller 44 then dubs the recording data to be recovered from the HDD 12 to the new DVD 31-2. The DVD recovering process is now ended.

If the processes described above are to be performed according to a software program, then the software program is installed from a network or a recording medium into a computer of dedicated hardware components or a general-purpose computer which is capable of performing various functions according to programs installed therein.

The recording medium may include, separately from the recording and reproducing apparatus, a removable recording medium such as a magnetic disk (including a floppy disk), an optical disk (including a CD-ROM (Compact Disk-Read Only Memory), and the DVD 31 shown in FIG. 1), a magneto-optical disk (including an MD (Mini-Disk)), or a semiconductor memory, which stores the program and is distributed to provide the program to the user, or may include the FLASH memory 2 shown in FIG. 1 or a hard disk in the HDD 12 shown in FIG. 1, which stores the program and is incorporated in advance in the recording and reproducing apparatus and provided to the user.

The steps which are descriptive of the program recorded in the recording medium include processes which are carried out chronologically in the order described above and processes which are carried out concurrently or individually, rather than chronologically.

Although a certain preferred embodiment of the present invention has been shown and described in detail, it should be understood that various changes and modifications may be made therein without departing from the scope of the appended claims.

What is claimed is:

1. A method of processing information in an apparatus for processing information by recording data in a medium of a first type and a medium of a second type, comprising the steps of:

controlling a first startup process for the medium of the first type and a second startup process for the medium of the second type to be performed when the apparatus for processing information is turned on, said second startup process being more time-consuming than said first startup process;

starting to record predetermined recording data in the medium of the first type when said first startup process controlled by said controlling step is finished; and starting to read the predetermined recording data which are recorded in the medium of the first type, from the medium of the first type, and recording the read predetermined recording data in the medium of the second type when said second startup process controlled by said controlling step is finished, wherein the read predetermined recording data is recorded in the medium of the second type in a higher rate than that of the medium of the first type until the recorded data in the medium of the second type catches up on that of the medium of the first type, and wherein when the recorded data in the medium of the second type catches up on that of the medium of the first type, the second recording control means records the read predetermined recording data in the medium of the second type in a normal rate that is substantially the same as that of the medium of the first type.

2. A recording medium storing a program to be executed by a computer for controlling a recording apparatus for recording data in a medium of a first type and a medium of a second type, comprising the steps of:

controlling a first startup process for the medium of the first type and a second startup process for the medium of the second type to be performed when the recording apparatus is turned on, said second startup process being more time-consuming than said first startup process;

starting to record predetermined recording data in the medium of the first type when said first startup process controlled by said controlling step is finished; and starting to read the predetermined recording data which are recorded in the medium of the first type, from the medium of the first type, and recording the read predetermined recording data in the medium of the second type when said second startup process controlled by said controlling step is finished, wherein the read predetermined recording data is recorded in the medium of the second type in a higher rate than that of the medium of the first type until the recorded data in the medium of the second type catches up on that of the medium of the first type, and wherein when the recorded data in the medium of the second type catches up on that of the medium of the first type, the second recording control means records the read predetermined recording data in the medium of the second type in a normal rate that is substantially the same as that of the medium of the first type.

3. An apparatus for processing information by recording data in a medium of a first type and a medium of a second type, comprising:

memory means for storing data;

a startup process controller unit for controlling a first startup process for the medium of the first type and a second startup process for the medium of the second type to be performed when the apparatus for processing information is turned on, said second startup process being more time-consuming than said first startup process;

a first recording controller unit for starting to record predetermined recording data in the medium of the first type when said first startup process controlled by said startup process controller is finished; and a second recording controller unit for starting to read the predetermined recording data which are recorded in the medium of the first type by said first recording controller, from the medium of the first type, and recording the read predetermined recording data in the medium of the second type when said second startup process controlled by said startup process controller is finished, wherein the second recording controller unit records the read predetermined recording data in the medium of the second type in a higher rate than that of the medium of the first type until the recorded data in the medium of the second type catches up on that of the medium of the first type, and wherein when the recorded data in the medium of the second type catches up on that of the medium of the first type, the second recording control means records the read predetermined recording data in the medium of the second type in a normal rate that is substantially the same as that of the medium of the first type.

* * * * *